United States Patent
Darras et al.

(10) Patent No.: US 12,448,284 B2
(45) Date of Patent: Oct. 21, 2025

(54) MEMBRANE TRANSFER METHOD

(71) Applicant: Soitec, Bernin (FR)

(72) Inventors: François-Xavier Darras, Bernin (FR); Bruno Ghyselen, Bernin (FR)

(73) Assignee: Soitec, Bernin (FR)

( * ) Notice: Subject to any disclaimer, the term of this patent is extended or adjusted under 35 U.S.C. 154(b) by 378 days.

(21) Appl. No.: 18/249,313

(22) PCT Filed: Oct. 6, 2021

(86) PCT No.: PCT/FR2021/051733
§ 371 (c)(1),
(2) Date: Apr. 17, 2023

(87) PCT Pub. No.: WO2022/079374
PCT Pub. Date: Apr. 21, 2022

(65) Prior Publication Data
US 2023/0406696 A1    Dec. 21, 2023

(51) Int. Cl.
*B81C 1/00* (2006.01)
(52) U.S. Cl.
CPC .. *B81C 1/00158* (2013.01); *B81B 2203/0127* (2013.01); *B81B 2203/0315* (2013.01); *B81B 2203/04* (2013.01); *B81C 2201/0192* (2013.01)
(58) Field of Classification Search
CPC ........ B81C 1/00158; B81C 2201/0192; B81B 2203/0127; B81B 2203/0315; B81B 2203/04
See application file for complete search history.

(56) References Cited

U.S. PATENT DOCUMENTS

| | | | |
|---|---|---|---|
| 6,958,255 B2 | 10/2005 | Khuri-Yakub et al. | |
| 2004/0085858 A1 | 5/2004 | Khuri-Yakub et al. | |

FOREIGN PATENT DOCUMENTS

| | | |
|---|---|---|
| FR | 2715502 A1 | 7/1995 |
| FR | 3079616 A1 | 10/2019 |
| TW | I663706 B | 6/2019 |
| TW | 201942959 A | 11/2019 |
| WO | 2013/018603 A1 | 2/2013 |
| WO | 2019/141952 A1 | 7/2019 |
| WO | 2020/128244 A1 | 6/2020 |

OTHER PUBLICATIONS

International Search Report for International Application No. PCT/FR2021/051733 dated Jan. 14, 2022, 3 pages.

(Continued)

*Primary Examiner* — Samuel A Gebremariam
(74) *Attorney, Agent, or Firm* — TraskBritt (57) ABSTRACT

A method for producing a device comprising a membrane of piezoelectric nature above at least one cavity comprises:
a) providing a carrier substrate having a cavity opening out onto its front face, the cavity having a lateral dimension larger than 30 μm;
b) providing a donor substrate having a buried weakened plane delimiting a surface layer;
c) depositing, on the front face of the donor substrate, a stiffening layer made of piezoelectric material having a thickness greater than 500 nanometers;
d) joining the carrier substrate and donor substrate; and
e) splitting the donor substrate at the buried weakened plane so as to transfer the membrane comprising the surface layer and the stiffening layer to the carrier substrate.

14 Claims, 5 Drawing Sheets

(56) References Cited

OTHER PUBLICATIONS

International Written Opinion for International Application No. PCT/FR2021/051733 dated Jan. 14, 2022, 6 pages.
Taiwanese Office Action for Application No. 110137351 dated Jan. 21, 2025, 26 pages with machine translation.
Japanese Notice of Reasons for Rejection for Application No. 2023-520443 dated Jul. 2, 2025, 4 pages with English translation.
Taiwanese Office Action for Application No. 110137351 dated Jul. 7, 2025, 16 pages with machine translation.

MEMBRANE TRANSFER METHOD

CROSS-REFERENCE TO RELATED APPLICATIONS

This application is a national phase entry under 35 U.S.C. § 371 of International Patent Application PCT/FR2021/051733, filed Oct. 6, 2021, designating the United States of America and published as International Patent Publication WO 2022/079374 A1 on Apr. 21, 2022, which claims the benefit under Article 8 of the Patent Cooperation Treaty to French Patent Application Serial No. FR2010644, filed Oct. 16, 2020.

TECHNICAL FIELD

The present disclosure relates to the field of microelectronics and microsystems. In particular, it relates to a method for producing a structure comprising a membrane having a piezoelectric nature capable of deforming above at least one cavity.

BACKGROUND

MEMS (microelectromechanical systems) devices find wide use in the production of a variety of sensors. The operating principle of many of these MEMS devices is that of a vibrating flexible membrane above a cavity. Mention may be made, for example, of PMUT (piezoelectric micromachined ultrasonic transducer) microsystems. In operation, the vibration of the membrane generated by a physical parameter, for example, the propagation of an acoustic wave, is converted into an electrical signal (or vice versa, depending on whether the device is in receiver or emitter mode).

To produce a structure with a membrane suspended over cavities, a number of approaches may be taken. A first approach involves disassembling an SOI (silicon-on-insulator) substrate previously bonded to a substrate provided with cavities. Another approach comprises steps of deposition and of releasing of the membrane through chemical attack.

Forming a suspended membrane by way of sacrificial deposition has a number of drawbacks: the empty space in the cavity might be limited, the risk of bonding the membrane to the bottom of the cavity during release, the risk of partial release, the difficulty in managing the mechanical stresses on the membrane, etc. Additionally, forming a suspended membrane by bonding an SOI substrate before removing it by grinding/chemical attack allows better control of the atmosphere in the cavity (sealed at the moment of bonding). However, this operation is relatively expensive because it requires the consumption of an SOI substrate.

Another, more elegant alternative involves employing the transfer of a layer directly over the cavities using the Smart Cut™ technique in order to form the suspended membrane.

With this alternative, it is difficult to transfer a membrane over cavities with large dimensions. However, there is a real need for cavities with large dimensions, especially for PMUT devices in which the cavities generally measure several hundred microns so that their operating frequency is not too high and is between 0.1 and 10 MHz.

French patent FR2715502 describes how to transfer a membrane suspended over cavities using Smart Cut™. According to this teaching, when the substrate comprising the cavities is made of silicon, the dimension (Lmax) of the cavities should be less than 10 times the thickness (e0) of the transferred membrane. What is understood by "dimension" of the cavity is the lateral dimension in the main plane of the front face of the substrate, for example, a width, a length, a diameter, etc.

Additionally, the maximum thickness (e0) of the membrane to be transferred using a Smart Cut™-type method is limited by the donor substrate implantation energy, and therefore cannot be more than a few microns. Specifically, the high-energy ion implanters (>250 keV), which could allow deeper implantation, have low fluxes, and the ion implantation step would require a significant amount of time. Consequently, to implant the target doses (several $10^{16}$ $cm^{-2}$), the method would be difficult to carry out (slow) and expensive. In addition, such equipment is not standard. As a result, the maximum lateral dimension of a cavity in this type of structure obtained using Smart Cut™ cannot be more than a few tens of microns.

BRIEF SUMMARY

The present disclosure aims to overcome all or some of the aforementioned drawbacks. It relates to a method for using Smart Cut™ to transfer a membrane of piezoelectric nature to a substrate comprising at least one cavity of large size.

To that end, the present disclosure relates to a method for producing a device comprising a membrane of piezoelectric nature above at least one cavity, the method comprising the following steps:

a) providing a carrier substrate having a first face extending over a plane (x, y) and provided with a cavity opening out onto the first face, the cavity having a lateral dimension in the plane (x, y) that is larger than 30 μm, b) providing a donor substrate provided with a buried weakened plane formed by implanting light species through a front face of the donor substrate, the weakened plane delimiting a surface layer, c) depositing, on the front face of the donor substrate, a stiffening layer made of piezoelectric material having a thickness greater than 500 nm, d) joining the carrier and donor substrates at a bonding interface disposed between the first face of the carrier substrate and the stiffening layer, e) splitting, after step d), the donor substrate at the buried weakened plane so as to transfer a membrane comprising the surface layer and the stiffening layer to the carrier substrate, the membrane being located above the cavity.

According to other advantageous and non-limiting features of this production method, which may be implemented alone or in any technically feasible combination:

the donor substrate is made of silicon or of silicon carbide,
the carrier substrate is made of silicon,
the donor substrate is made of silicon and the stiffening layer is deposited at a temperature lower than 450° C.,
the donor substrate is made of silicon carbide and the stiffening layer is deposited at a temperature lower than 850° C.,
the implanted light species are hydrogen ions and/or helium ions,
a first electrically conductive layer is interposed between the stiffening layer and the carrier substrate, the first layer being directly in contact with the stiffening layer and configured to form a lower electrode of the device,
a bonding layer is interposed between the stiffening layer and the carrier substrate, the bonding layer being directly in contact with the carrier substrate, the bonding layer preferably being made of silicon oxide,
a second electrically conductive layer is formed on the stiffening layer, the second layer being configured to form an upper electrode of the device,
the method comprises at least one mechanical grinding operation and/or at least one chemical-mechanical polishing operation and/or at least one chemical etching operation on the surface layer after splitting step e),
joining step d) comprises bonding by molecular adhesion between, on the one hand, the donor substrate provided with the stiffening layer and, on the other hand, the first face of the carrier substrate,
a step of deposition on the free surface of the surface layer is performed after step e) so as to increase the thickness of the surface layer.

According to another aspect of the present disclosure, the present disclosure also relates to a donor substrate configured to transfer a membrane of piezoelectric nature to a carrier substrate provided with at least one cavity having a lateral dimension larger than 30 μm, the donor substrate comprising:
a weakened plane disposed in the donor substrate and delimiting a surface layer, and
a stiffening layer made of piezoelectric material having a thickness (e) greater than 500 nm disposed on the surface layer.

BRIEF DESCRIPTION OF THE DRAWINGS

Other features and advantages of the present disclosure will become apparent from the following detailed description of the present disclosure, which is given with reference to the appended figures, in which.

DETAILED DESCRIPTION

In the description, the same references in the figures may be used for elements of the same type. The figures are schematic representations, which, for the sake of legibility, are not to scale. In particular, the thicknesses of the layers along the z-axis are not to scale with respect to the lateral dimensions along the x- and y-axes; and the relative thicknesses of the layers with respect to one another have not necessarily been respected in the figures.

The present disclosure relates to a method for transferring a membrane 14 of piezoelectric nature to a carrier substrate 1 comprising cavities 11 (FIGS. 1-5), the transfer method aiming to produce a structure 10 comprising buried cavities 11 of large size.

The method according to the present disclosure comprises a step of providing the carrier substrate 1 (see FIG. 1) the latter has a first face 12 intended to be joined to a donor substrate 2 and a second face 12', referred to as the back face, opposite the first face 12. By way of non-limiting example, the carrier substrate 1 may comprise silicon, glass, sapphire, etc. The thickness of the carrier substrate 1 may be on the order of a few hundred μm, typically 775 μm for substrates having a diameter of approximately 300 mm.

Figure 1:
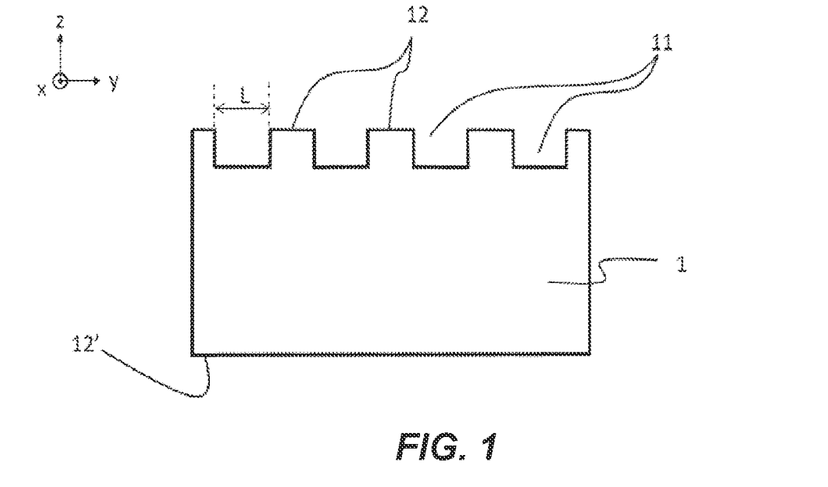
FIGS. 1-5 show steps in a method for transferring a membrane disposed above buried cavities, in accordance with the present disclosure.

The carrier substrate 1 comprises a plurality of cavities 11 opening out onto the first face 12 thereof. Each cavity 11 has a bottom and peripheral walls. Preferably, the carrier substrate 1 is a silicon substrate.

The geometry of each cavity 11, which is dependent on the target device, in particular, the target MEMS device, is defined by:
the shape of the cavity 11 in the plane of the first face 12 of the carrier substrate 1 (referred to as the main plane (x,y)): the shape of the cavity 11 will possibly be circular, square, rectangular or polygonal;
the lateral dimensions L of the cavity 11 in the main plane (x,y): the lateral dimensions L will possibly vary from a few tens of microns to a few millimeters;
the depth of the cavity 11 along the z-axis normal to the main plane (x,y): the depth of the cavity 11 will possibly vary from a few hundred nanometers to a few tens of microns, or even a few hundred microns.

According to the present disclosure, the transfer method comprises transferring a membrane 14 of piezoelectric nature to the carrier substrate 1 comprising the buried cavities 11 of large size. What is meant by "large size" is that the lateral dimension L in the plane (x,y) of the cavities 11 is larger than 30 μm.

The planar distribution of the cavities 11, i.e., their distribution in the main plane (x,y), is also dependent on the target device and will define the inter-cavity spacing 11: the planar distribution of the cavities 11 will possibly vary from a few microns to a few hundred microns, or even a few millimeters. The inter-cavity spacing will possibly be uniform and identical over the entire surface of the carrier substrate 1, or the inter-cavity spacing may vary between regions on the surface of the carrier substrate 1.

It will be noted that the carrier substrate 1 will possibly contain cavities 11 having different shapes, lateral dimensions, depths and/or planar distributions, in particular, if provision is made to co-integrate devices of various types into the structure 10 comprising buried cavities.

Various layers will possibly be deposited on the bottom and/or on the walls of the cavities 11 (for example, silicon nitride, silicon oxide, etc.) depending on the type of device intended to be produced with the structure 10 comprising buried cavities 11.

Figure 2:
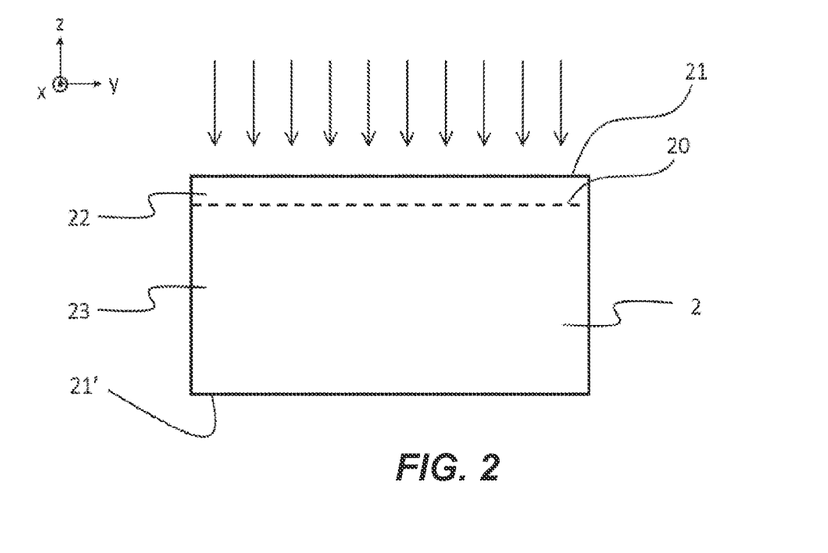

The method according to the present disclosure also comprises a step of providing a donor substrate 2 having a front face 21, which is intended to be joined to the carrier substrate 1, and a back face 21' (see FIG. 2).

By way of example, and in a non-limiting manner, the donor substrate 2 will possibly comprise at least one semiconductor material such as, for example, silicon, silicon carbide, gallium nitride, etc., or a piezoelectric material such as, for example, lithium tantalate, lithium niobate, aluminum nitride, zinc oxide, PZT, etc. Preferably, the donor substrate 2 is a silicon substrate or a silicon carbide (SiC) substrate.

The step of providing the donor substrate 2 may also comprise a step of implanting light species into the donor substrate 2 through the front face 21 so as to form a weakened plane 20 that lies between a first portion of the donor substrate 2, intended to form a surface layer 22, and a second portion 23 intended to make up the rest of the donor substrate 2. Preferably, the implanted light species are hydrogen ions and/or helium ions.

The thickness of the first portion, and therefore of the future surface layer 22, is dependent on the implantation energy of the light species (hydrogen and/or helium, for example). Advantageously, the implantation energy is chosen so that the first portion of the donor substrate 2 has a thickness of about 0.2 microns to 2 microns.

Figure 3:
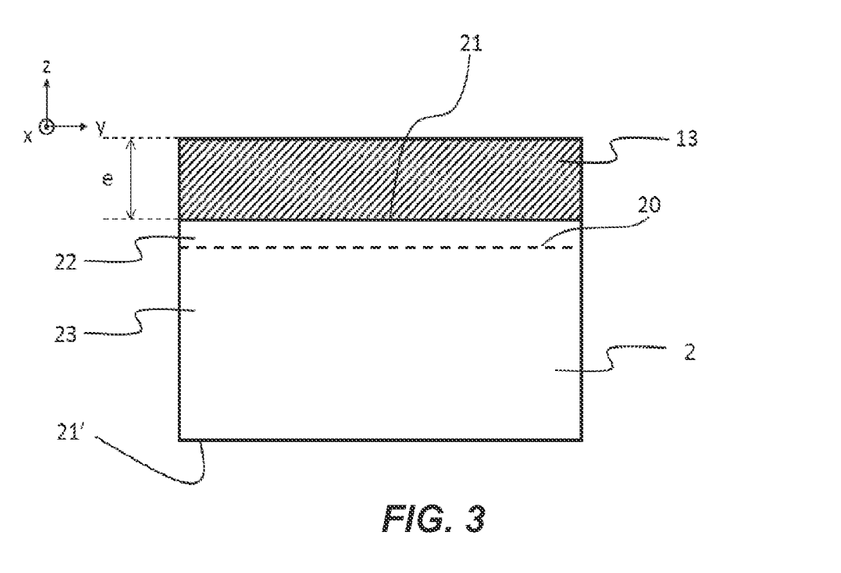

Additionally, the method according to the present disclosure further comprises a step of depositing a stiffening layer 13 made of material having a piezoelectric nature on the front face 21 of the donor substrate 2 (see FIG. 3). The deposition step is implemented after the step of ion implantation of light species into the donor substrate 2. The thickness e of the layer 13 is greater than 500 nm. Even more preferably, the thickness e of the layer 13 is greater than 1 µm or even than 4 µm.

The stiffening layer 13 may comprise a material chosen from lithium niobate ($LiNbO_3$), lithium tantalate ($LiTaO_3$), potassium-sodium niobate ($K_xNa_{1-x}NbO_3$ or KNN), barium titanate ($BaTiO_3$), quartz, lead zirconate titanate or PZT ($Pb(Zr,Ti)O_3$), a compound of lead-magnesium niobate and of lead titanate (PMN-PT) in variable proportions (for example, 70/30 or 90/10) depending on the sought-after properties, zinc oxide (ZnO), aluminum nitride (AlN) or aluminum-scandium nitride (AlScN), etc.

Preferably, the stiffening layer 13 is made of AlN or PZT. Specifically, these two materials are considered to be the most commonly used piezoelectric materials in the MEMS field. Additionally, the elasticity coefficient of AlN is on the order of 300 GPa, and it is substantially higher than that of PZT. Thus, even more preferably, AlN will be chosen as the piezoelectric material of the stiffening layer 13.

By way of exemplary implementation, when the stiffening layer 13 is made of AlN and the donor substrate 2 is made of silicon provided with cavities having lateral dimensions of approximately 50 µm, the thickness of the stiffening layer is preferably greater than or equal to 1.5 µm. According to another, similar exemplary implementation, in which the stiffening layer 13 is made of PZT, then the thickness of the stiffening layer 13 is preferably chosen so as to be greater than 7.5 µm.

Additionally, a person skilled in the art will be able to choose the thickness of the stiffening layer 13 according to the lateral dimensions L of the cavities 11 and the mechanical properties (for example, Young's modulus) of the stiffening layer 13 so as to succeed in transferring the membrane 14.

A person skilled in the art will also be able to adapt the temperature for the deposition of the stiffening layer 13 according to the nature of the donor substrate 2 so as to prevent blistering.

In other words, the stiffening layer 13 is advantageously deposited at a temperature that is adapted and configured so as to prevent blistering that may be caused by the weakened plane 20 under the effect of a heat treatment with a high thermal budget.

Specifically, the effect of implanting light ions is to create defects (vacancies or interstitial defects) at the weakened plane 20. These defects are commonly called platelets and they have a size on the order of about ten nanometers. The effect of the temperature brings about a change in the population of these defects through Ostwald ripening, thereby leading to the occurrence of microcracks or microcavities. When oversaturated, the light ions implanted into the donor substrate 2 precipitate in gaseous form into these microcavities under the effect of the temperature. When a high thermal budget is applied, the cavities then grow vertically and laterally in the form of bubbles and coalesce, causing blistering on the front face 21.

According to one variant embodiment, when the donor substrate 2 is made of silicon (or comprises a layer made of silicon into which the light ions have been implanted), the deposition temperature is preferably lower than 450° C., and even more preferably lower than 400° C.

According to another variant embodiment, when the donor substrate 2 is made of silicon carbide (or comprises a layer made of silicon carbide into which the light ions have been implanted), the deposition temperature is preferably lower than 850° C.

The layer 13 may be deposited using any technique known to those skilled in the art that is compatible with conventional methods in the microelectronics field. Preferably, the stiffening layer 13 is deposited using cathode sputtering or using the sol-gel technique, which is a chemical deposition technique.

By way of example, deposition by cathode sputtering advantageously makes it possible to obtain crystallized piezoelectric layers for low deposition temperatures on the order of 300 or 400° C. for certain materials, such as aluminum nitride (AlN).

Advantageously, a piezoelectric stiffening layer 13 made of AlN is deposited using cathode sputtering according to the present disclosure.

Additionally, PZT is deposited using cathode sputtering at relatively higher temperatures than for the deposition of AlN, in order to be crystallized. The temperatures for the deposition of PZT may reach 700° C.

According to one embodiment of the present disclosure, a stiffening layer 13 made of PZT may be deposited using the sol-gel method. This is a chemical deposition technique: the precursors to be deposited are added in solid form to a solvent. The obtained solution is then spread over the front face 21 of the donor substrate 2. The spreading may be achieved by spin coating. The substrate is then dried to evaporate the solvent before undergoing a step of calcination to break up carbon chains. The sequence of spreading, drying and calcination steps may be repeated multiple times in order to increase the thickness of the obtained layer. Additionally, the obtained layer is generally amorphous in nature and requires a final crystallization/densification heat treatment step.

According to another embodiment, a stiffening layer 13 made of PZT may be produced using low-temperature MOCVD (metalorganic chemical vapor deposition). Specifically, it is known that this technique enables deposition of PZT in a crystalline state at temperatures that may be lower than 400° C. or even less.

According to one embodiment of the present disclosure, the method optionally comprises a heat treatment for healing the deposited stiffening layer 13. The healing heat treatment may advantageously serve to partially or completely recrystallize the stiffening layer 13. This treatment may also be used to degas and/or rid the deposited piezoelectric layer of impurities, which might have been introduced into the layer during, before or after deposition thereof. According to one alternative, the heat treatment may comprise a thermal anneal to improve the crystal quality of the deposited layer 13.

Figure 4:
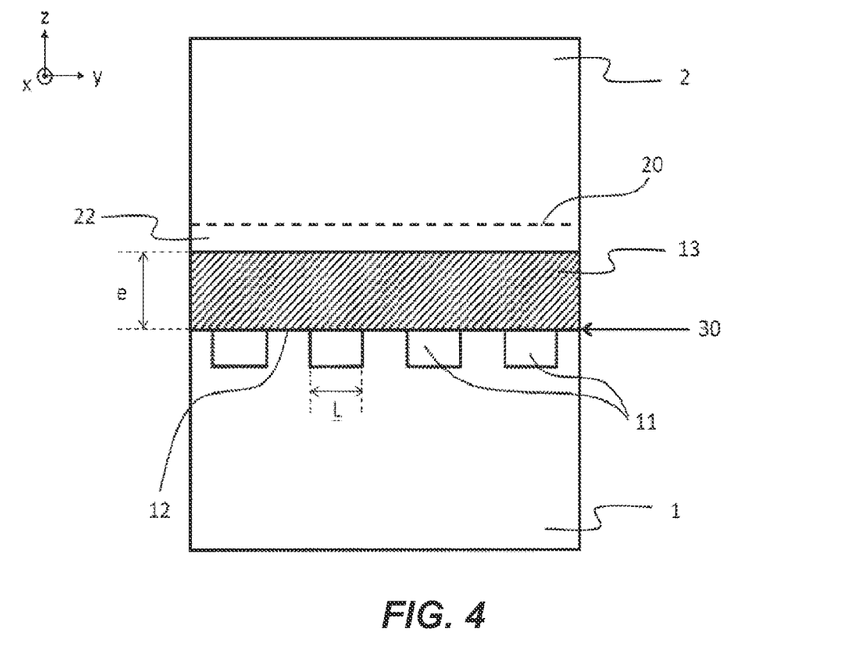

As illustrated in FIG. 4, the method according to the present disclosure further comprises a step of joining the carrier 1 and donor 2 substrates. The carrier 1 and donor 2 substrates are joined at a bonding interface 30 disposed between the first face 12 of the carrier substrate 1 and the stiffening layer 13 disposed on the front face 21 of the donor substrate 2.

Advantageously, this step comprises direct bonding, by molecular adhesion, between: on the one hand, the first face 12 of the donor substrate 2 and, on the other hand, the stiffening layer 13 of the carrier substrate 1. The principle of molecular adhesion, which is well known in the prior art, will not be described in further detail here. It will be noted that the surfaces to be joined must have a very good surface finish (cleanness, low roughness, etc.) for a joint of good quality to be obtained.

Advantageously, in order to guarantee a joint of good quality, the joining step comprises cleaning the surfaces to be joined of the donor substrate 2 (here according to this embodiment the surface of the stiffening layer 13) and the carrier substrate 1, before the surfaces are brought into contact. By way of example, a conventional sequence used in microelectronics, especially for silicon-based substrates, comprises an ozone clean, an SC1 clean (SC1 being the acronym of Standard Clean 1) and an SC2 clean (SC2 being the acronym of Standard Clean 2) with intermediate rinses. The surfaces to be joined may also be activated, for example, using a plasma, before being brought into contact, in order to promote a high bonding energy between the surfaces.

The method according to the present disclosure may also include a step of splitting the donor substrate 2 at the buried weakened plane 20 so as to transfer a membrane 14 comprising the surface layer 22 and the stiffening layer 13 to the carrier substrate 1. The splitting occurs at the buried weakened plane 20, between the surface layer 22 and the rest 23 of the donor substrate 2 (see FIGS. 2, 4 and 5).

Figure 5:
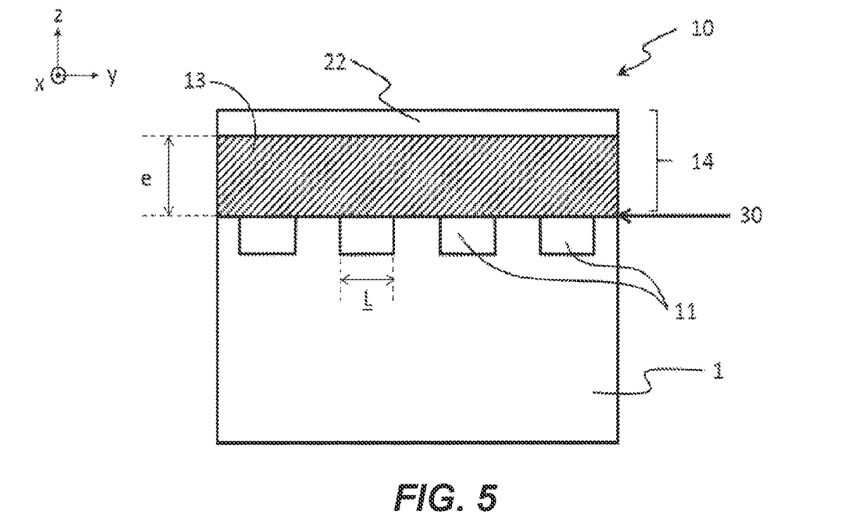

Additionally, the splitting step is, of course, carried out after the step of joining the carrier substrate 1 and the donor substrate 2 provided with the stiffening layer 13. It is a conventional splitting step as per the Smart Cut™ method.

As illustrated in FIG. 5, upon completion of the splitting step, a membrane 14 transferred to the carrier substrate 1 is obtained. It will be recalled that the Smart Cut™ method advantageously allows thin layers having an excellent thickness uniformity to be obtained. This criterion may be very advantageous for certain MEMS devices requiring flexible membranes exhibiting controlled thicknesses.

This splitting is preferably performed during a heat treatment at a temperature of between a few hundred degrees and 950° C. Preferably, the splitting is implemented during a heat treatment carried out at a temperature lower than 700° C. when the weakened plane is disposed in a silicon layer of the donor substrate 2. According to another embodiment, the splitting is implemented during a heat treatment carried out at a temperature lower than 950° C. when the weakened plane is disposed in a silicon carbide layer of the donor substrate 2.

According to one embodiment, the splitting step could alternatively be mechanically assisted or performed after the heat treatment, by way of a mechanical stress.

According to the embodiment in which the stiffening layer 13 is made of PZT deposited using sol-gel, the splitting heat treatment performed at a temperature of between 500 and 750° C. will advantageously allow the splitting of the donor substrate and the recrystallization of the deposited PZT. In other words, the splitting heat treatment also comprises the heat treatment for healing the PZT layer.

After the membrane 14 has been transferred to the carrier substrate 1, the splitting step may comprise a finishing treatment aiming to improve the crystal quality (removal of defects from the layer), the surface quality (removal of residual roughness from the free surface of the layer 22) and/or to modify the thickness of the surface layer 22. This treatment will possibly include one or more heat treatments, chemical-mechanical polishes, chemical etches, epitaxial growth and/or deposition of additional layers.

Specifically, in certain cases where the thickness of the surface layer 22 transferred using the Smart Cut™ method is insufficient, it is possible to increase this thickness by depositing an additional layer on the free surface of the surface layer 22, for example, by epitaxial growth or other known deposition methods, during a finishing treatment that is mentioned above (see FIG. 6D). The additional layer is preferably of the same nature as the surface layer 22.

Upon completion of the method according to the present disclosure, what is obtained is a structure 10 provided with buried cavities 11 of large size, and a membrane 14 of piezoelectric nature (comprising the surface layer 22 and the stiffening layer 13) above the one or more cavities 11.

The method according to the present disclosure is easy to implement and advantageously allows the effective transfer of a membrane to a carrier substrate provided with cavities of large size, i.e., cavities having a lateral dimension larger than 30 μm. The membrane is transferred in its entirety and benefits from the advantages of the Smart Cut™ method. Specifically, it has been observed that a stiffening layer having a thickness greater than 500 nm makes it possible to increase the stiffening effect on the donor substrate, even though its nature is piezoelectric and different from the donor substrate. This advantageously makes it possible to avoid the problems of blistering and/or of partial transfer of a membrane that may occur when the Smart Cut™ method involves a carrier substrate covered with cavities of large size. What is meant by "partial transfer" is that a part of the membrane is not transferred to the carrier substrate after the splitting step.

In addition, the stiffening layer according to the present disclosure is of piezoelectric nature. Thus, the method according to the present disclosure provides a solution that is elegant, easy to implement and effective in producing a membrane of piezoelectric nature on a substrate with cavities of large size, while benefiting from the advantages of the Smart Cut™ method. In other words, the transferred membrane exhibits excellent uniformity of thickness, which may be highly advantageous for certain MEMS devices that require flexible membranes above cavities, with controlled thicknesses. In particular, the obtained structure may be used to produce PMUT devices in which the cavities generally measure several hundred microns. By virtue of the benefits of the Smart Cut™ method, the piezoelectric nature of the transferred membrane, and the large size of the cavities in the carrier substrate, the method according to the present disclosure makes it possible to obtain a structure configured for the production, in particular, of PMUT devices having a precise and uniform operating frequency.

Figure 6A:
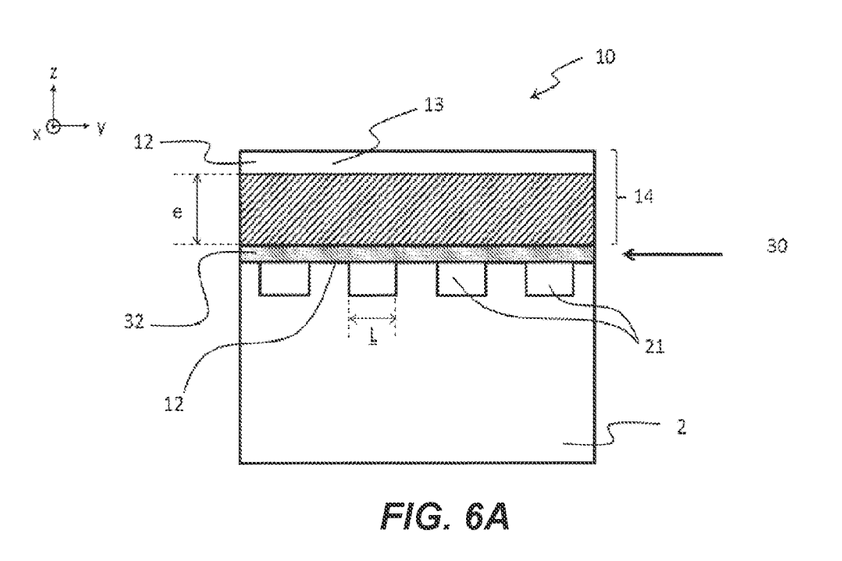
FIGS. 6A-6D show variants and other steps in a transfer method according to the present disclosure.

According to one embodiment illustrated in FIG. 6A, the carrier substrate 1 and/or the donor substrate 2 may comprise a bonding layer 32 at the first face 12 and/or above the stiffening layer 13, respectively, in order to promote bond quality and the bonding energy of their interface. The bonding layer 32 is preferably disposed on the stiffening layer 13 such that the bonding interface 30 is between the first face 12 of the carrier substrate 1 and the bonding layer 32 (see FIGS. 6A and 6C). Advantageously, the bonding layer 32 is made of silicon oxide. Specifically, silicon oxide can be easily deposited and allows a roughness compatible with direct bonding to be obtained.

Preferably, the bonding layer 32 is made of silicon oxide and it is formed using TEOS (tetraethyl orthosilicate) PECVD. After deposition thereof, the oxide layer may be planarized and then cleaned in order to prepare it for the direct bonding step, as described above.

In addition to the layer 32 configured to improve bonding, additional layers may be provided, in particular, at the stiffening layer 13. The arrangement, nature and function of these layers will be described in detail below.

Figure 6B:
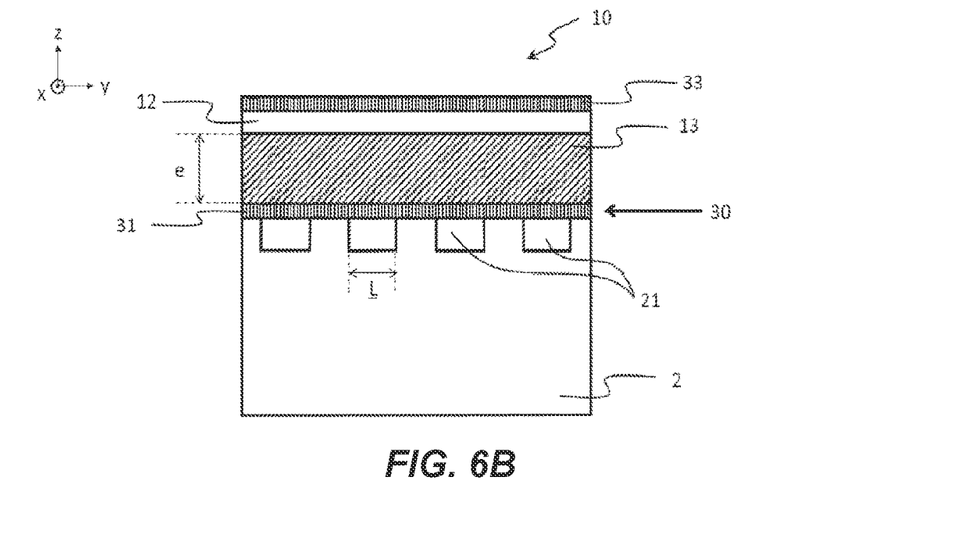

According to one embodiment illustrated in FIG. 6B, a first electrically conductive layer 31 is interposed between the stiffening layer 13 and the carrier substrate 1. The first layer 31 is directly in contact with the stiffening layer 13, and the first layer 31 is configured so as to form a lower electrode 31 of the device 10 produced upon completion of the method according to the present disclosure.

The first layer 31 may be deposited after the step of depositing the stiffening layer 13. This layer 31 may be made of platinum (Pt), gold (Au), copper (Cu), molybdenum or aluminum (Al). Additionally, the first layer 31 may be produced using any technique known to those skilled in the art that is compatible with conventional methods in the microelectronics field. The lower electrode 31 may advantageously take the form of an interdigitated comb.

By way of example, the first layer 31 may be deposited using PVD (physical vapor deposition). The deposition is preferably performed at low temperature (lower than 450° C.). For the deposition of the layer 31, tie and/or diffusion barrier layers may also be provided. A tie layer serves to improve the quality of deposition of the layer 31 on the donor substrate 2, in particular, if the layer 31 is of metallic nature. Additionally, a diffusion barrier layer advantageously makes it possible to prevent the diffusion of metals in the final structure during possible later technological steps.

According to one embodiment, when the layer 31 is compatible with direct bonding (sufficient level of roughness), it may be bonded directly to the carrier substrate 1 (e.g., Au/Au direct bonding). In this case, thermocompression bonding may also be employed.

According to one embodiment of the present disclosure in which the bonding layer 32 is used as described above, the bonding layer 32 may be deposited on the first layer 31.

According to another embodiment illustrated in FIG. 6B, a second electrically conductive layer 33 is formed on the surface layer 22. The second layer 32 is directly in contact with the surface layer 22 and it is configured so as to form an upper electrode 32 of the device 10 produced upon completion of the method according to the present disclosure.

Figure 6C:
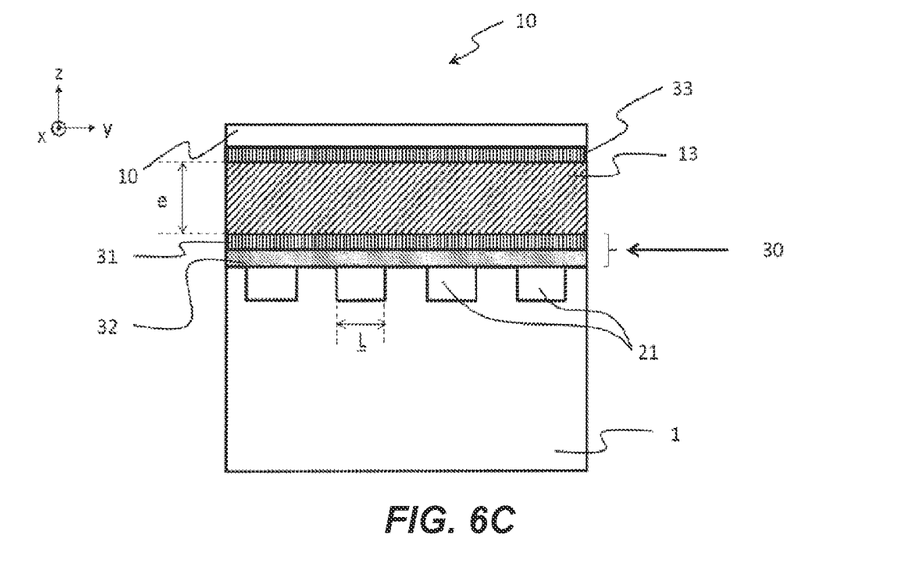
Figure 6D:
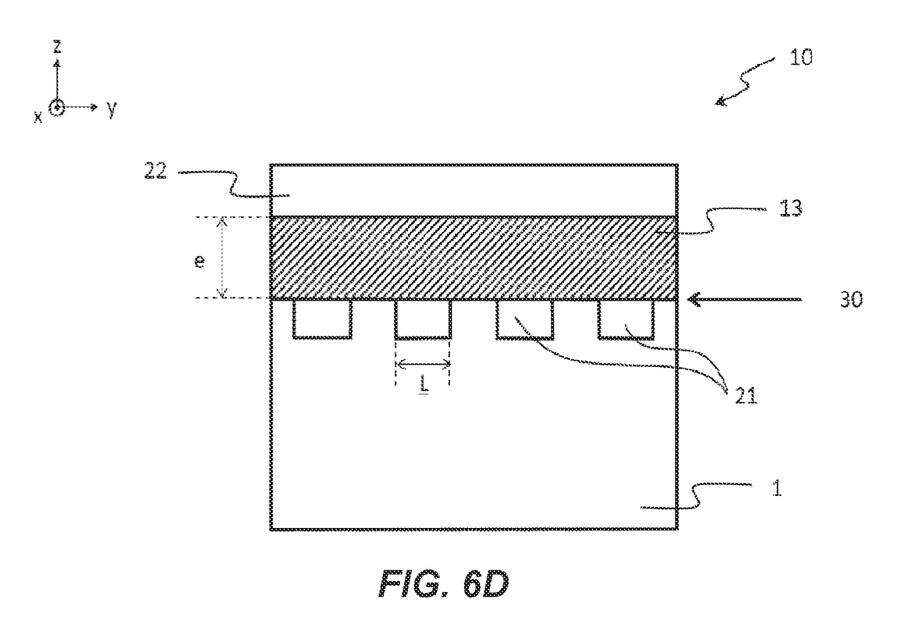

The second layer 33 may be deposited after the splitting step (see FIG. 6B) or before the deposition of the stiffening layer 13 (see FIG. 6C). This layer 33 may be made of platinum (Pt), gold (Au), copper (Cu), molybdenum or aluminum (Al).

Preferably, and as illustrated in FIG. 6C, the layer 33 is deposited before the deposition of the stiffening layer 13 such that it is interposed, after the splitting step, between the surface layer 22 and the stiffening layer 13. According to this embodiment, the electrodes 31 and 33 are advantageously buried and are therefore passivated such that they are less exposed to unwanted oxidation or deterioration.

Additionally, the second layer 33 may be produced in the same way as the layer 31, in other words using any technique known to those skilled in the art that is compatible with conventional methods in the microelectronics field. Furthermore, the layers 31 and 33 may have a thickness ranging from a few nanometers to a few tens of nanometers.

The present disclosure also relates to a donor substrate 2 configured to transfer a membrane 14 of piezoelectric nature to a carrier substrate 1 comprising cavities 11 of large size (FIGS. 1-5).

As illustrated in FIG. 3, the donor substrate 2 comprises a bulk substrate comprising at least one semiconductor material, for example, silicon, silicon carbide, gallium nitride, etc., or a piezoelectric material, for example, lithium tantalate, lithium niobate, aluminum nitride, zinc oxide, PZT, etc. Preferably, the donor substrate 2 is a silicon substrate or a silicon carbide (SiC) substrate.

The donor substrate according to the present disclosure is provided with a weakened plane 20 that lies between a first portion of the donor substrate 2, intended to form a surface layer 22, and a second portion 23 intended to make up the rest of the donor substrate 2. The weakened plane is formed by implanting light species into the donor substrate 2. Preferably, the implanted light species are hydrogen ions and/or helium ions.

Furthermore, the donor substrate 2 is provided with a stiffening layer 13 of piezoelectric nature, disposed on the front face 21 of the donor substrate 2. The thickness e of the layer 13 is greater than 500 nm. Even more preferably, the thickness e of the layer 13 is greater than 1 µm or even 4 µm.

The stiffening layer 13 may comprise a material chosen from lithium niobate ($LiNbO_3$), lithium tantalate ($LiTaO_3$), potassium-sodium niobate ($K_xNa_{1-x}NbO_3$ or KNN), barium titanate ($BaTiO_3$), quartz, lead zirconate titanate or PZT ($Pb(Zr,Ti)O_3$), a compound of lead-magnesium niobate and of lead titanate (PMN-PT) in variable proportions (for example, 70/30 or 90/10) depending on the sought-after properties, zinc oxide (ZnO), aluminum nitride (AlN) or aluminum-scandium nitride (AlScN), etc.

Preferably, the stiffening layer 13 is made of AlN or of PZT.

The layer 13 may be deposited using any technique known to those skilled in the art that is compatible with conventional methods in the microelectronics field. Preferably, the stiffening layer 13 is deposited using cathode sputtering or using the sol-gel technique, which is a chemical deposition technique.

The donor substrate according to the present disclosure is advantageously configured to transfer a membrane 14 formed by the stiffening layer 13 and the surface layer 22 to a carrier substrate 1 provided with cavities 11 of large size (see FIG. 5). The donor substrate 2 according to the present disclosure advantageously allows the transfer of a membrane providing both a stiffening nature to facilitate successful effective transfer of the membrane, and a piezoelectric nature to produce devices requiring such a material, in particular, PMUT devices.

The invention claimed is:

1. A method for producing a device comprising a membrane of piezoelectric nature above at least one cavity, the method comprising:
   a) providing a carrier substrate having a first face extending over a plane and a cavity opening out onto the first face, the cavity having a lateral dimension in the plane that is larger than 30 µm;
   b) providing a donor substrate having a buried weakened plane formed by implanting light species through a front face of the donor substrate, the weakened plane delimiting a surface layer;
   c) depositing, on the front face of the donor substrate, a stiffening layer made of piezoelectric material having a thickness greater than 500 nm;
   d) joining the carrier substrate and the donor substrate at a bonding interface disposed between the first face of the carrier substrate and the stiffening layer; and
   e) splitting, after joining the carrier substrate and the donor substrate, the donor substrate at the buried weakened plane so as to transfer a membrane comprising the surface layer and the stiffening layer to the carrier substrate, the membrane being located above the cavity.

2. The method of claim 1, wherein the donor substrate is made of silicon or of silicon carbide.

3. The method of claim 1, wherein the carrier substrate is made of silicon.

4. The method of claim 1, wherein the donor substrate is made of silicon and the stiffening layer is deposited at a temperature lower than 450° C.

5. The method of claim 1, wherein the donor substrate is made of silicon carbide and the stiffening layer is deposited at a temperature lower than 850° C.

6. The method of claim 1, wherein the implanted light species are hydrogen ions and/or helium ions.

7. The method of claim 1, further comprising interposing a first electrically conductive layer between the stiffening layer and the carrier substrate, the first layer being directly in contact with the stiffening layer and configured to form a lower electrode of the device.

8. The method of claim 1, further comprising interposing a bonding layer between the stiffening layer and the carrier substrate, the bonding layer being directly in contact with the carrier substrate.

9. The method of claim 8, further comprising forming the bonding layer to be made of silicon oxide.

10. The method of claim 1, further comprising forming a second electrically conductive layer on the stiffening layer, the second electrically conductive layer being configured to form an upper electrode of the device.

11. The method of claim 1, further comprising performing at least one mechanical grinding operation and/or at least one chemical-mechanical polishing operation and/or at least one chemical etching operation on the surface layer after splitting the donor substrate at the buried weakened plane.

12. The method of claim 1, wherein the joining of the carrier substrate and the donor substrate comprises bonding by molecular adhesion between, the donor substrate provided with the stiffening layer and the first face of the carrier substrate.

13. The method of claim 1, further comprising depositing, on the free surface of the surface layer, is performed after splitting the donor substrate at the buried weakened plane so as to increase the thickness of the surface layer.

14. A donor substrate configured to transfer a membrane of piezoelectric nature to a carrier substrate having at least one cavity having a lateral dimension larger than 30 μm, the donor substrate comprising:
   a weakened plane disposed in the donor substrate and delimiting a surface layer; and
   a stiffening layer made of piezoelectric material having a thickness greater than 500 nm disposed on the surface layer.

\* \* \* \* \*